Figure 1:
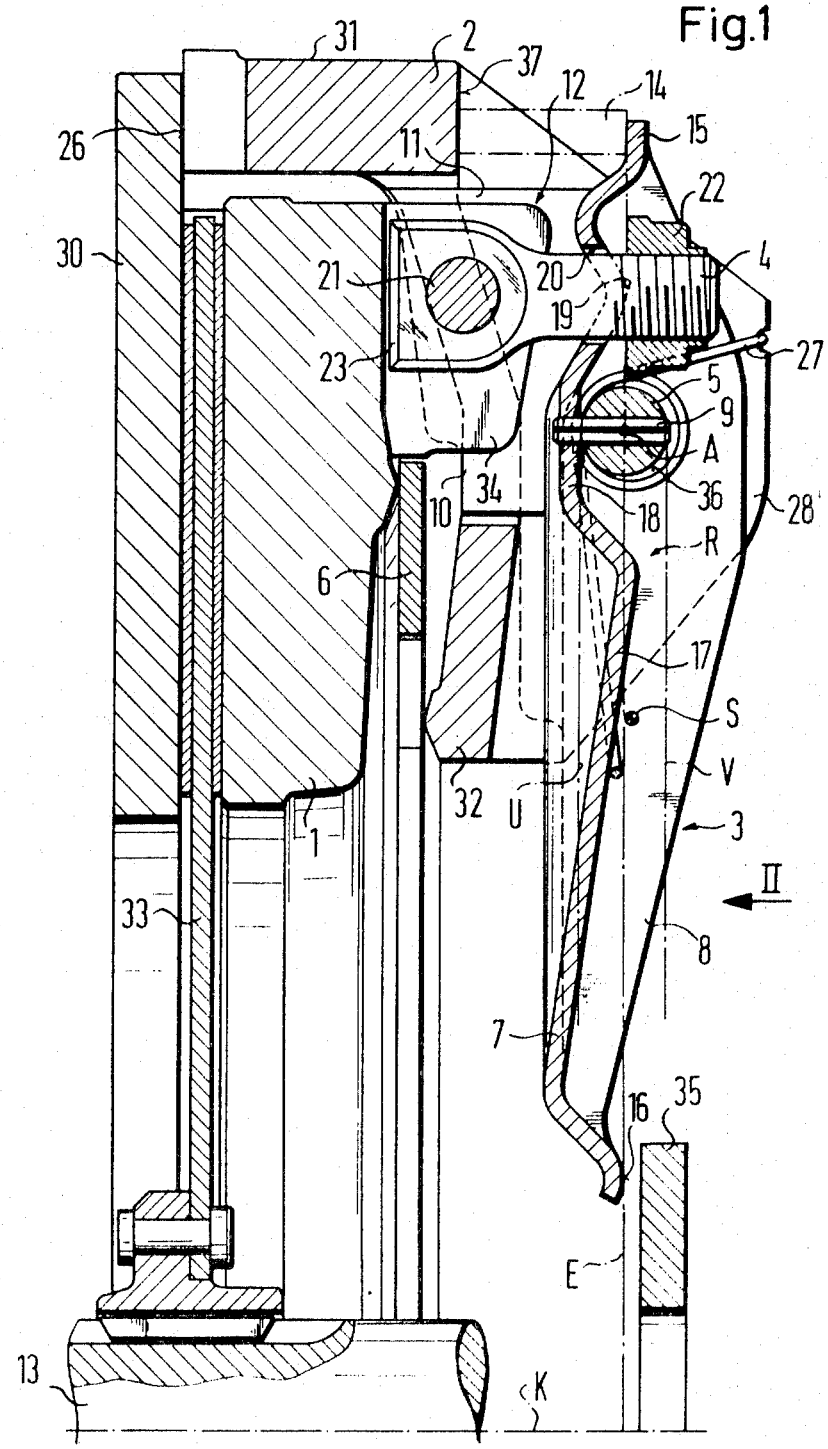

United States Patent [19]
Kraus et al.

[11] 3,732,958
[45] May 15, 1973

[54] CLUTCH ASSEMBLY

[75] Inventors: Helmut Kraus; Kurt Fädler; Hans-Walter Riese, all of Schweinfurt am Main, Germany

[73] Assignee: Fichtel & Sachs AG, Schweinfurt am Main, Germany

[22] Filed: June 1, 1971

[21] Appl. No.: 148,351

[30] Foreign Application Priority Data

June 5, 1970 Germany....................P 20 27 687.3

[52] U.S. Cl..............192/70.3, 192/99 A, 192/113 A
[51] Int. Cl................................................F16d 11/06
[58] Field of Search........................192/99 A, 70.29, 192/70.3, 113 A

[56] References Cited

UNITED STATES PATENTS

| | | | |
|---|---|---|---|
| 2,171,908 | 9/1939 | Beringer | 192/70.29 |
| 2,870,893 | 1/1959 | Palm | 192/113 A |
| 2,920,731 | 1/1960 | Zeidler | 192/99 A |
| 3,337,016 | 8/1967 | Maucher | 192/70.3 |
| 2,496,411 | 2/1950 | Root | 192/99 A |

Primary Examiner—Charles J. Myhre
Assistant Examiner—Randall Heald
Attorney—Kelman & Berman

[57] ABSTRACT

The elements of an automotive friction clutch which are usually installed in a vehicle as a pre-assembled group include a clutch housing, clutch release levers pivoted on the outer or rear face of the radial housing wall, eye bolts pivotally engaged by respective levers, passing through apertures in the radial wall and pivoted to the pressure plate in the housing. The levers are of rearwardly open U-shaped cross section, and their flange portions slidably engage guide faces of the rear wall which bound the afore-mentioned apertures and axially guide bearing blocks on the pressure ring to which the eye bolts are pivoted. The levers are fastened to the radial housing wall by respective pivot pins journaled in ribs of the housing wall and attached to the levers by radial fastening members.

8 Claims, 2 Drawing Figures

CLUTCH ASSEMBLY

This invention relates to friction clutches, and more particularly to improvements in a clutch assembly normally installed as a unit in a motorcar for cooperation with other individually installed clutch elements.

More specifically, the invention is concerned with improvements in a known clutch assembly having a cast-metal housing intended to be fastened to the flywheel of an associated internal-combustion engine. An annular pressure plate is secured against rotation in the cavity of the housing, guided in the direction of the clutch axis toward and away from a separately installed driven clutch disc, and biased toward the driven disc by one or more clutch springs. The pressure plate is guided in its axial path by bearing blocks movably engaging guide faces of the clutch housing.

The clutch release mechanism includes release levers connected with the pressure plate by axially extending motion transmitting members. An abutment on each lever may be engaged by a clutch release bearing to pivot the lever on the clutch housing and thereby to retract the pressure plate from the driven disc.

Known clutch assemblies of the type outlined above are quite complex and have relatively great axial length which limits their application in small cars. The improvement contributed by the instant invention is intended to reduce the axial length of the clutch assembly, to simplify its structure, and to facilitate its installation.

With these objects and others in view, as will hereinafter become apparent, the invention provides a clutch assembly of the type described with apertures in the radial housing wall which bounds the housing cavity in a rearward axial direction. The motion transmission members which pull the pressure plate rearward from the driven clutch disc, when the clutch release levers are operated, pass through the apertures, and a terminal portion of each motion transmitting member rearwardly offset from the radial housing wall pivotally engages the associated clutch release lever. The latter is of approximately U-shaped cross section defined by a web portion and two flange portions of the lever, the open side of the U-shape being directly rearward and bounded by the flange portions.

Each lever is secured to the clutch housing by a pivot pin which passes through respective openings in the flange portions and a fastening member which connects the pivot pin to the flange portion of the lever, and thereby secures the lever on the pivot pin against angular displacement relative to the pin axis.

Figure 2:
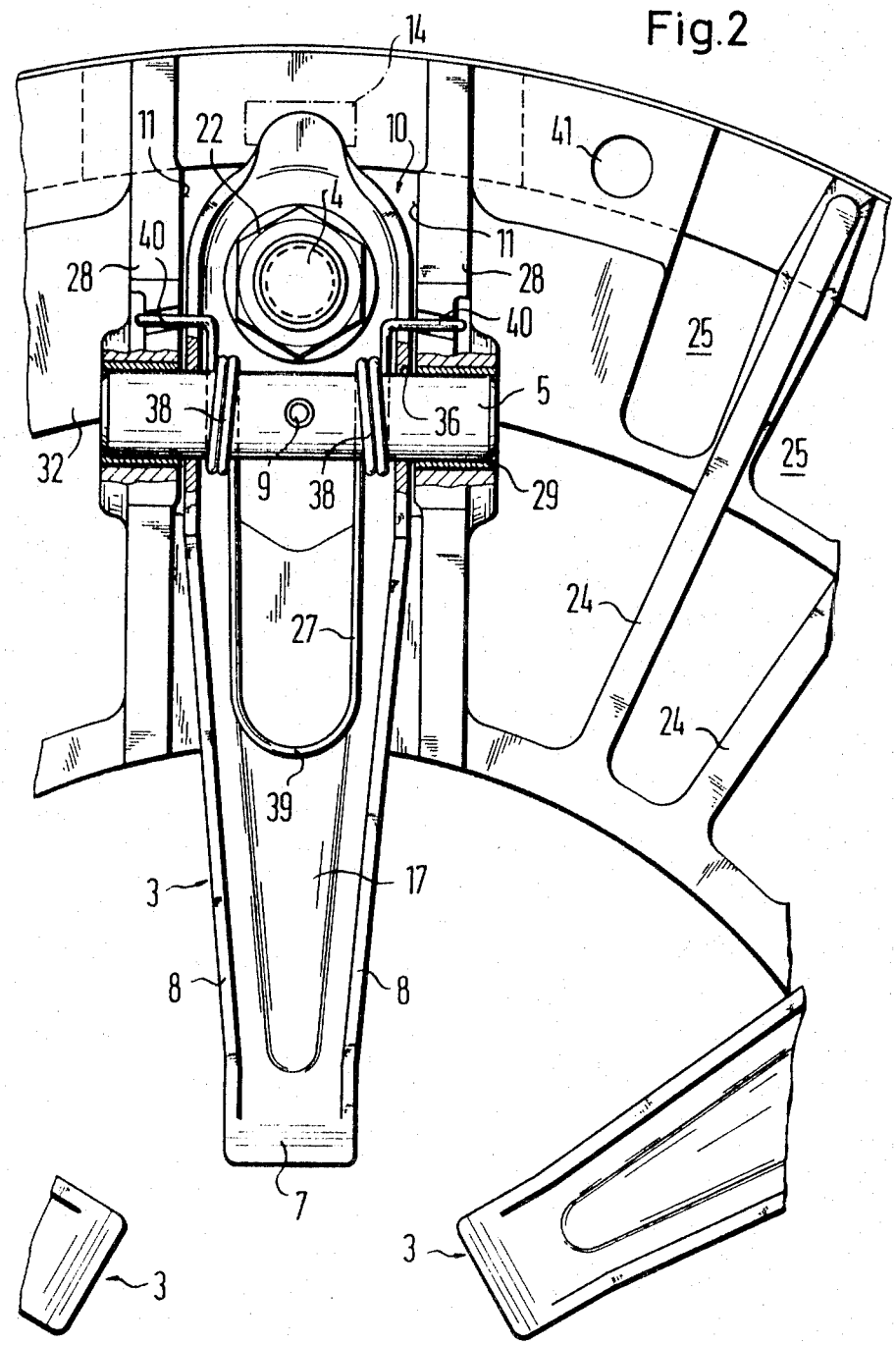

Other features and the attendant advantages of this invention will readily be appreciated as the invention becomes better understood by reference to the following detailed description of a preferred embodiment when considered in connection with the appended drawing in which:

FIG. 1 shows an automotive clutch arrangement, including the clutch assembly of the invention, in fragmentary radial section; and FIG. 2 shows the clutch assembly of FIG. 1 in fragmentary rear elevation, as viewed in the direction of the arrow II.

For the sake of convenient description, the apparatus illustrated in the drawing will be described in its relationship to a motorcar having a front-mounted engine and driven rear wheels, and the clutch axis K will therefore be referred to as extending forward and rearward.

It will be understood, however, that the terms have no relevance to the actual orientation of the clutch relative to an associated car since the invention is equally useful where the positions of the engine and the driven wheels are reversed, or where the clutch axis does not extend in the normal direction of vehicle movement.

In the clutch arrangement illustrated in FIG. 1, the driving member is the flywheel 30 of an internal-combustion engine, not shown otherwise. The output member is a clutch shaft 13 on which a driven friction disc 33 is splined for axial movement toward and away from the rear face of the flywheel 30. The clutch may be disengaged by a release bearing 35 movable in the direction of the clutch axis K. This invention is more specifically concerned with the assembly of other clutch elements which is normally installed as a unit for cooperation with the conventional elements described so far.

The assembly is mounted on a clutch housing 2 having a circumferential wall 31 which radially bounds a cavity in the housing 2. The cavity of the installed housing is axially bounded in a forward direction by the flywheel 30, and in a rearward direction by a radial wall 32 of the housing which is a unitary metal casting. As is better seen in FIG. 2, the radial housing wall 32 is annular, and apertures 10, 25 pass axially therethrough. A pressure plate 1 in the housing cavity is connected with six clutch release levers 3 equiangularly spaced about the clutch axis on the outer or rear face of the housing wall 32 by respective eye bolts 4 which pass through the six apertures 10 respectively. The levers 3 are mounted on pivot pins 5 between integral radial ribs 28 on the rear face of the wall 32. The pressure plate 1 is biased in a forward axial direction by a diaphragm spring 6 interposed in the housing cavity between the radial wall 32 and the pressure plate 1.

The apertures 25 in the radial housing wall 32 which are separated by stiffening ribs 24 permit the flow of cooling air through the clutch housing 2 in a radial direction.

Each of the six clutch levers 3 is elongated radially relative to the clutch axis K and is a unitary piece of sheet metal bent into an approximately U-shaped cross section. It has a web portion 7 and two flange portions 8 extending rearwardly from the longitudinal edges of the web portion and bounding the open side of the U-shape which is directed axially toward the rear. The rounded, radially innermost portion of the lever 3 provides an abutment 16 for engagement with the clutch release bearing 35 in a conventional manner. The web portion 7 is partly offset inward of the U-shape to form a reinforcing rib 17 which begins near the abutment 16 and extends radially outward, its end 18 being located closely adjacent the pivot pin 5. As is evident from joint consideration of FIGS. 1 and 2, the pin 5 is journaled in bearing sleeves 29 set into respective openings of ribs 28 and freely passes through bores 36 in the two flange portions 8 of the lever 3. The lever is fastened to the pivot pin 5 by a cotter pin 9 which passes through the pin 5 and the web portion 7 in a direction radial to the axis of the pin 5 which itself is tangential to a circle about the clutch axis K. The ribs 28 are integral with the radial housing wall 32, and their faces 11 circumferentially bound the opening 10.

Spacedly adjacent the pin 5 in a direction away from the clutch axis K, the web portion 7 has a rounded projection 19 formed with an opening 20 therethrough.

The convex surface of the projection 19 within the U-shape of the lever 3 provides pivotal engagement for a nut 22 on the eye bolt 4. The outermost end portion 15 of the lever 3 has a radial face spacedly aligned in the direction of the clutch axis with an opposite radial face 37 on the circumferential housing wall 31. A spacer 14, shown in chain-dotted lines, may be inserted between the two radial faces for a purpose presently to be explained.

Six bearing blocks 12 integral with the pressure plate 1 extend from the radial rear face of the latter into respective apertures 10 of the radial housing wall 32 and slidably engage the faces 11 of the ribs 28 in such a manner that the bearing blocks 12 are axially guided in the housing 2 by the faces 11. These faces similarly cooperate with the outer surfaces of the flange portions 8 to guide the pivoting movement of the levers 3. Each bearing block is slotted in an axial plane, and the slots 34 respectively receive the terminal front portions of the eye bolts 4. Each bolt is attached to the associated bearing block 12 by a pivot pin 21 extending through the slot 34 so that the two ends of each eye bolt may pivot about respective axes tangential to circles about the clutch axis through the center of the pivot pin 21 and through the projection 19 which engages a radial face of the nut 22. The front edge 23 of the eye bolt 4 is spacedly parallel to the bottom of the slot 34 in the illustrated position, the spacing being small enough to limit pivoting movement of the eye bolt 4 on the pressure plate 1 to a very small angle.

Engagement between the projection 19 of the lever 3 and the nut 22 on the eye bolt 4 is maintained by a wire spring 27 best seen in FIG. 2. The central portion 39 of the spring is bent into a long U-shape and abuttingly engages the rib 17. The two portions of the spring on either side of the central portion 39 are bent into helical turns 38 about the pin 5, and the two hook-shaped spring ends 40 are engaged in notches in the ribs 28.

Axial bores 41 are distributed circumferentially about the wall 31 and normally receive bolts which fasten the radial, annular front face 26 of the circumferential wall 31 to the rear face of the flywheel 30 as is shown in FIG. 1.

When the housing 2 is assembled with the elements supported thereon, the diaphragm spring 6 tends to push the pressure plate 1 out of the housing 2 in a forward direction. To facilitate installation of the clutch assembly, spacers 14 are interposed between the opposite faces of the clutch releasing levers 3 and the circumferential wall 31 after the levers 3 are pivoted sufficiently on the pins 5 in a clockwise direction as viewed in FIG. 1. When the levers 3 are released, the pressure plate 1 is held in the illustrated position by the eye bolts 4 and does not interfere with installation of the driven friction disc 33 and the subsequent bolting of the housing 2 to the flywheel 30.

When the clutch release bearing 35 is moved toward the left, as viewed in FIG. 1, by depressing the clutch pedal of the motorcar, the lever 3 is pivoted clockwise about the axis of the pin 5, and the movement of the lever 3 is transmitted to the pressure plate 1 by the eye bolt 4 which pulls the pressure plate toward the right against the restraint of the diaphragm spring 6. The spring returns the entire apparatus to the illustrated engaged position when the clutch pedal pressure is relaxed, the movement of the pressure plate 1 being transmitted to the lever 3 by the eye bolt 4.

Movement of the lever 3 in a counterclockwise direction is limited by engagement of the friction disc 33 with the rear face of the flywheel 30 and the front face of the pressure plate 1. Clockwise lever movement is limited by the stroke of the clutch release bearing and by abutting engagement of clutch elements in such a manner that the center of gravity S of the lever 3 is always closely adjacent a reference plane E perpendicular to the clutch axis K and passing through the axis of the pin 5. Similar reference planes U, V perpendicular to the clutch axis K and tangential to the cylindrical pivot pin 5 on opposite sides of the plane E axially bound a space R. In all operative positions of the lever 3, the center of gravity S, the abutment 16, and the pivot provided by the projection 19 at its point of engagement with the nut 22 are located in the space R, as is the rib 17, or at least a major portion of the rib, and the radial face of the lever portion 15 opposite the face 37 of the housing wall 31.

The afore-described arrangement of the several parts of the clutch assembly makes the entire assembly very short in an axial direction. Because the apertures 10 and their side faces 11 provide guidance both for the bearing blocks 12 and the levers 3, the structure is relatively simple. The axial dimension of the clutch assembly is further reduced by locating the spring 6 within the cavity of the clutch housing 2.

Because the center of gravity of the lever 3 is at least approximately aligned with the axis A of the pivot pin 5, centrifugal forces do not exert significant torque on the lever 3, and the effects of centrifugal forces on the functioning of the levers 3 are further reduced by holding other parts of the lever 3 in the space R axially bounded by the planes U, V in all operative positions of the lever, that is, at all times when the clutch assembly of the invention is installed in a motorcar together with other elements illustrated in FIG. 1. Installation is greatly facilitated by the spacers 14, as described above, and the spacers are released in a simple manner by depressing the clutch pedal after assembly is completed. They are readily accessible for manual removal.

It should be understood, of course, that the foregoing disclosure relates only to a preferred embodiment, and that it is intended to cover all changes and variations in the example of the invention herein chosen for the purpose of the disclosure which do not constitute departures from the spirit and scope of the appended claims.

What is claimed is:

1. A clutch assembly comprising:
   a. a rotatable clutch housing having a first axis, said housing being a unitary metal casting including
      1. a circumferential wall about said axis defining a cavity in said housing,
      2. a radial wall axially bounding said cavity in a rearward direction, and
      3. a plurality of rearwardly projecting, circumferentially spaced, radially elongated stiffening ribs, said radial wall being formed with apertures extending therethrough in the direction of said axis, respective axial guide faces of said ribs bounding said apertures;
   b. a pressure plate in said cavity;
   c. a plurality of bearing members fixedly fastened to said pressure plate and slidably received in respective associated apertures of said radial wall in guiding engagement with the guide faces bounding said apertures, and thereby securing said pressure plate to said housing for joint rotation about said axis;

d. yieldably resilient means biasing said pressure plate in an axially forward direction; and e. clutch release means for moving said pressure plate rearward against the restraint of said resilient means, said clutch release means including 1. a motion transmitting member pivotally fastened to each bearing member for angular movement about a second axis tangential relative to a circle about said first axis, said motion transmitting member passing through the aperture associated with the fastened bearing member and having a terminal portion rearwardly offset from said radial wall, 2. a clutch release lever associated with each motion transmitting member and elongated radially relative to said first axis, said lever having a web portion and two flange portions jointly defining an approximately U-shaped cross section of said lever, said flange portions bounding a rearwardly directed open side of said U-shape, at least one of said flange portions having a contact face movably engaging a guide face bounding the aperture which receives the associated motion transmitting member and being rearwardly spaced from a bearing member received in said aperture, 3. pivot means securing said lever to said housing for pivotal movement about a third axis tangential relative to a circle about said first axis, said contact face and the engaged guide face guiding said pivotal movement, said pivot means including a pivot pin member passing through respective openings in said flange portions, and a fastening member connecting said pivot pin member and said web portion and securing said lever on said pivot pin member against angular displacement relative to said pivot pin member about said third axis, 4. abutment means on the radially inner end portion of said lever for engagement with a clutch release bearing, and 5. engaging means on said lever longitudinally intermediate said pivot means and the radially outer end portion of said lever and pivotally engaging said terminal portion of the associated motion transmitting member.

2. A clutch assembly as set forth in claim 1, said third axis defining a first plane of reference perpendicular to said first axis, said lever having a center of gravity closely adjacent said first plane of reference.

3. A clutch assembly as set forth in claim 2, said pivot pin member being of circular cross section and defining second and third planes of reference tangential to said pivot pin member and perpendicular to said first axis, said center of gravity being located in the space axially bounded by said second and third planes of reference in all operative positions of said lever.

4. A clutch assembly as set forth in claim 3, said abutment means and said engaging means being located in said space in all operative positions of said lever.

5. A clutch assembly as set forth in claim 3, a reinforcing rib on said web portion elongated in the direction of elongation of said lever, at least a major portion of said rib being located in said space.

6. A clutch as set forth in claim 1, said outer end portion of said lever and said housing having respective abutment faces spacedly aligned in the direction of said first axis and radial relative to said first axis.

7. A clutch as set forth in claim 6, said pivot pin member being of circular cross section and defining second and third planes of reference tangential to said pivot pin member and perpendicular to said first axis, said radial abutment face of the lever being located in the space axially bounded by said second and third reference planes in all operative positions of said lever.

8. A clutch as set forth in claim 1, said yieldably resilient means including a diaphragm spring interposed in said cavity between said housing and said pressure plate.

* * * * *